United States Patent
Zhu et al.

(10) Patent No.: US 6,517,235 B2
(45) Date of Patent: Feb. 11, 2003

(54) USING REFRACTORY METAL SILICIDATION PHASE TRANSITION TEMPERATURE POINTS TO CONTROL AND/OR CALIBRATE RTP LOW TEMPERATURE OPERATION

(75) Inventors: Zhong Yun Zhu, Singapore (SG); Rajneesh Jaiswal, Santa Clara, CA (US); Haznita Abd Karim, Singapore (SG); Bei Chao Zhang, Singapore (SG); Johnny Cham, Singapore (SG); Ravi Sankar Yelamanchi, Singapore (SG); Chee Kong Leong, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 62 days.

(21) Appl. No.: 09/867,560

(22) Filed: May 31, 2001

(65) Prior Publication Data

US 2002/0191668 A1 Dec. 19, 2002

(51) Int. Cl.⁷ .................. G01K 17/00; H01L 21/477
(52) U.S. Cl. .................. 374/1; 438/17; 438/664
(58) Field of Search .................. 374/1; 438/664, 438/663, 682, 14, 17, 1

(56) References Cited

U.S. PATENT DOCUMENTS

| 5,326,170 | A | | 7/1994 | Moslehi et al. | 374/2 |
|---|---|---|---|---|---|
| 5,331,676 | A | | 7/1994 | Lambert et al. | 376/260 |
| 5,593,923 | A | * | 1/1997 | Horiuchi et al. | 437/200 |
| 5,780,360 | A | * | 7/1998 | Tseng et al. | 438/680 |
| 6,132,081 | A | | 10/2000 | Han | 374/1 |
| 6,136,613 | A | | 10/2000 | Lin et al. | 438/4 |
| 6,136,699 | A | * | 10/2000 | Inoue | 438/656 |
| 6,257,760 | B1 | * | 7/2001 | Davis et al. | 374/185 |
| 6,329,670 | B1 | * | 12/2001 | Hu | 257/48 |
| 6,399,487 | B1 | * | 6/2002 | Lai et al. | 438/664 |
| 2001/0053600 | A1 | * | 12/2001 | Morales et al. | 438/627 |

* cited by examiner

Primary Examiner—Diego Gutierrez
Assistant Examiner—Gail Verbitsky
(74) Attorney, Agent, or Firm—George O. Saile; Rosemary L. S. Pike

(57) ABSTRACT

A method for controlling and/or calibrating rapid thermal process systems is described. One or more wafers comprising a silicon semiconductor substrate having a refractory metal layer thereon are silicided in a RTP system at different temperatures. Sheet resistance uniformity of the wafer is measured thereby detecting silicidation phase transition temperature points at the highest uniformity points. The temperature points are used to calibrate or to reset the RTP system. A plurality of wafers comprising a silicon semiconductor substrate having a refractory metal layer thereon can be silicided in each of a plurality of rapid thermal process systems. Sheet resistance uniformity of each of the wafers is measured thereby detecting silicidation phase transition temperature points by highest sheet resistance uniformity for each of the RTP systems. The temperature points are used to match temperatures for each of the RTP systems. The temperature point depend upon the type of refractory metal used and can range from about 200 to 800 ° C.

25 Claims, 3 Drawing Sheets

USING REFRACTORY METAL SILICIDATION PHASE TRANSITION TEMPERATURE POINTS TO CONTROL AND/OR CALIBRATE RTP LOW TEMPERATURE OPERATION

BACKGROUND OF THE INVENTION

(1) Field of the Invention

The invention relates to the fabrication of integrated circuit devices, and more particularly, to a method of precise temperature control in RTP low temperature operation and monitoring in the fabrication of integrated circuits.

(2) Description of the Prior Art

Rapid thermal processing (RTP) has been implemented in many thermal fabrication steps in integrated circuit manufacturing. Precise control of time and temperature are necessary for reproducible results in RTP processes. It is especially difficult to control rapid thermal annealing (RTA) systems and to match temperatures between systems in the low temperature region of between about 200 and 800° C. Commonly, a pyrometer sensor is used for RTP temperature control. The sensor detects the actual wafer temperature by an emitted optical signal from the wafer. This optical signal is relatively low compared to a high temperature emission. The signal from the wafer:

$$I\alpha\epsilon T^4$$

where T is the wafer temperature. For a lower temperature, the signal emitted from the wafer is smaller. If a thermocouple is used to detect the temperature, a lower temperature also results in a lower voltage signal from the thermocouple.

In the wafer fab or between fabs, the same or different hardware systems are used for RTP with the same recipe temperature settings for the same process. With current calibration systems, the absolute temperatures for the same recipe temperature setting can be different for each hardware system. This difference must be minimized in order to have system matching.

Temperature sensitivity curves, showing resistance versus temperature, have been used for system setup. However, wafer conditions and substrate composition have major impacts on the output sheet resistance of the RTP process. These factors are not included in temperature sensitivity curves. It is desired to find a method of more precise temperature control and temperature matching between systems.

U.S. Pat. No. 6,132,081 to Han discloses a method for determining a temperature for RTP to form titanium silicide. The temperature is set to be that temperature after which sheet resistance and/or nonuniformity are constant; that is, not sensitive to temperature. This method is also used to calibrate an optical sensor. This method will not be able to catch a temperature drift to the higher side and cannot be used in day-to-day system matching. U.S. Pat. No. 6,136,613 to Lin et al teaches a method of recycling monitoring control wafers including annealing and measuring sheet resistance. U.S. Pat. No. 5,331,676 to Lambert et al show a method of calibrating furnace temperature using a temperature probe. U.S. Pat. No. 5,326,170 to Moslehi et al shows calibration wafers having melting points of certain elements as calibration temperature points.

SUMMARY OF THE INVENTION

A principal object of the present invention is to provide an effective and very manufacturable method of temperature control in a rapid thermal process (RTP) system.

A further object of the invention is to provide a method of controlling RTP low temperature operation.

Yet another object is to provide a method of calibrating an RTP low temperature operation.

Yet another object is to provide a method of controlling and/or calibrating RTP low temperature operation by observing sheet resistance uniformity peak and uniformity change.

A further object is to provide a method of matching temperatures between RTP systems by detecting temperature shifts by observing sheet resistance uniformity peak and uniformity change.

A still further object of the invention is to provide a method of controlling and/or calibrating RTP low temperature operation by detecting temperature shifts by observing sheet resistance uniformity peak and uniformity change.

Yet another object is to provide a method of monitoring temperatures in a thermal processing system.

In accordance with the objects of the invention a novel method for calibrating RTP low temperature operations is achieved. A wafer comprising a silicon semiconductor substrate having a refractory metal layer thereon is silicided in a RTP system. Peak sheet resistance uniformity of the wafer is measured thereby detecting silicidation phase transition temperature points. Peak sheet resistance uniformity shifting from one temperature to another temperature indicates process shift. The temperature shift is used to reset and/or control the RTP system.

Also in accordance with the objects of the invention a novel method for controlling RTP low temperature operations is achieved. A wafer comprising a silicon semiconductor substrate having a refractory metal layer thereon is silicided in a RTP system. Peak sheet resistance uniformity of the wafer is measured thereby detecting silicidation phase transition first temperature points. Thereafter, a second wafer comprising a silicon semiconductor substrate having a different refractory metal layer thereon is silicided in the RTP system. Peak sheet resistance uniformity of the second wafer is measured thereby detecting silicidation phase transition second temperature points. The first and second temperature points are used for temperature calibration.

Also in accordance with the objects of the invention a novel method for matching temperatures of a plurality of RTP systems is achieved. A plurality of wafers comprising a silicon semiconductor substrate having a refractory metal layer thereon are silicided in each of a plurality of rapid thermal process systems. Peak sheet resistance uniformity of each of the wafers is measured thereby detecting silicidation phase transition temperature points for each of RTP systems. The temperature points having the highest uniformity are used to match temperatures for each of the RTP systems.

Also in accordance with the objects of the invention a novel method for controlling RTP system low temperature is achieved. A plurality of wafers comprising a silicon semiconductor substrate having different kinds of refractory metal layers thereon are silicided in a rapid thermal process system. The temperature can be as low as 200° C. Peak sheet resistance uniformity of each of the wafers is measured thereby detecting silicidation phase transition temperature points for each of the types of wafers. These temperature points are used to control the RTP system.

BRIEF DESCRIPTION OF THE DRAWINGS

In the accompanying drawings forming a material part of this description, there is shown.

DESCRIPTION OF THE PREFERRED EMBODIMENTS

Figure 1:
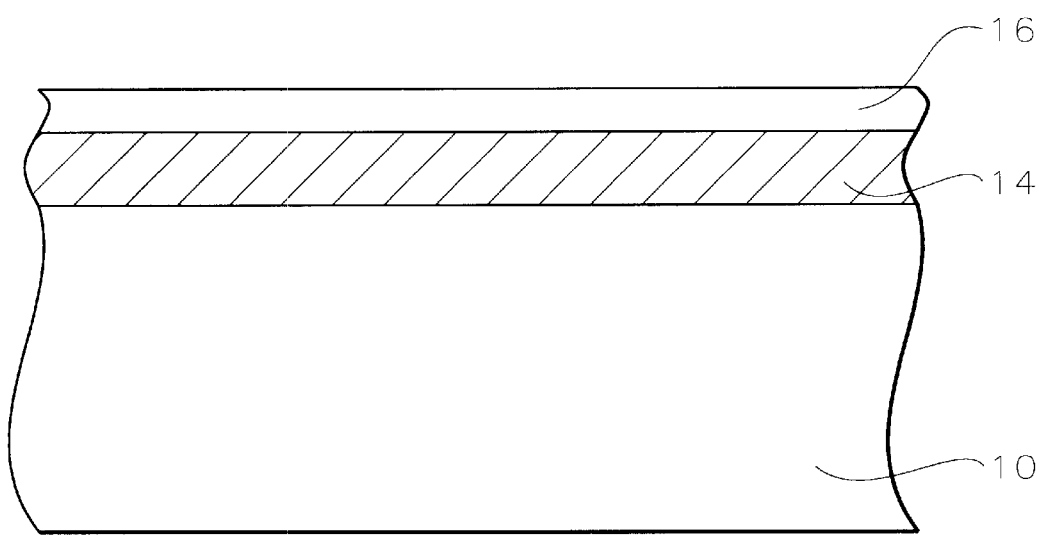
FIGS. 1 and 2 schematically illustrate in cross-sectional representation sample wafers used in a preferred embodiment of the present invention.

Precise temperature control is crucial to rapid thermal process (RTP) systems. Temperature shifts in RTP systems could cause large numbers of wafers to be scrapped. It is critical that any temperature shifts be detected early so that wafer scrapping can be eliminated. The process of the present invention can be used to set temperatures at system startup as well as to maintain temperature control as the system is in use. Furthermore, the process of the present invention can match temperatures between systems.

For example, a 5° C. temperature drift from the target temperature for titanium silicidation could affect the narrow polysilicon sheet resistance tremendously and could cause severe yield loss. Low temperature RTP applications, at less than about 750° C., include refractory metal silicidation, low temperature annealing, and heating. Temperature control is especially important in these operations.

Refractory metal salicidation phase transition shows a sharp rise and fall in the sheet resistance uniformity of the material. The highest uniformity of the refractory metal will occur at temperature points which indicate silicidation phase transition. For most refractory metal silicidation cases, the transition temperatures are located in the low temperature region. Low temperatures are becoming the industry trend for new materials. The silicidation phase transition temperature points can be used to detect different temperature set points for RTP low temperature control and/or system to system matching.

Once the temperature set points are found precisely for each different refractory metal, these set points can be used to calibrate the RTP system. The calibration method of the present invention has better results than calibration methods of the prior art. Current systems based on thermocouple results can be in error because of errors in the thermocouple or differences in the wafer calibration condition.

The temperature set points can be used to control the temperature of a RTP system. The peak sheet resistance uniformity will be different for different refractory metals. The peak sheet resistance uniformity is monitored. If the peak sheet resistance uniformity appears at a higher or lower temperature than the temperature set point, this indicates a drift in temperature. Corrective measures can be taken to shut down the system to prevent scrap and to recalibrate the system.

Current temperature control based on sheet resistance measurements is insensitive due to the variation in the incoming wafers. Sheet resistance change can be due to variations in the incoming wafer. Different wafers have different surface conditions, thicknesses, and resistivity. These factors as well as tube temperature can affect the sheet resistance, but do not affect the sheet resistance uniformity. Changes in the sheet resistance uniformity are affected only by the phase transfer temperature. Therefore, the process of the present invention, based on sheet resistance uniformity, is much more precise than prior art processes.

The process of the present invention can be used also in matching the temperatures between systems. By running the same type of wafer through the same process in different systems and measuring the sheet resistance uniformity, a temperature difference can be detected. Once this difference or offset is found, the systems can be tuned to match each other for the same process.

The method of the present invention uses observations of sheet resistance uniformity to detect temperature shifts. Sheet resistance uniformity is very sensitive to temperature because of the refractory metal silicidation phase transition.

The most sensitive temperatures can be picked up from one or more silicidation schemes using different refractory metal thicknesses and/or capping layers and detecting the temperature points. These changes in film thickness or capping layers can allow more transition temperature points to be identified. More temperature points could allow for a more accurate RTP system.

For example, to determine phase transition temperatures, a refractory metal layer, such as cobalt, nickel, titanium, tungsten, molybdenum, tantalum, platinum, or the like, is deposited on a wafer to a thickness of less than about 100 Angstroms to about 1000 Angstroms. A capping layer such as titanium, titanium nitride, or other materials could be deposited over the refractory metal layer to a thickness of less than about 100 Angstroms to about 500 Angstroms. FIG. 1 illustrates a wafer 10, for example. The refractory metal layer 14 has been deposited over the substrate and a capping layer 16 deposited over the refractory metal layer.

Figure 2:
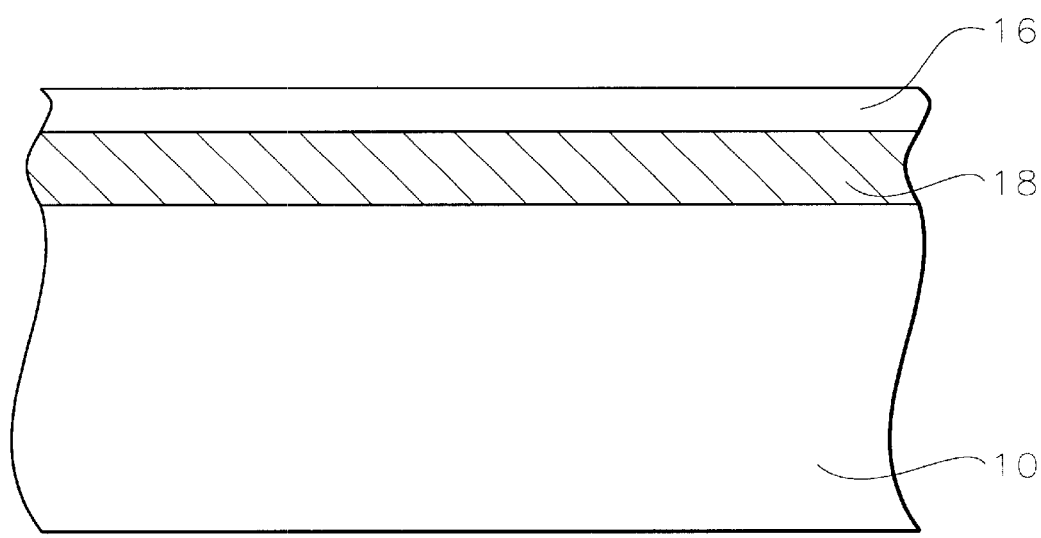

Now, the wafer is annealed using rapid thermal annealing (RTA) at a temperature of between about 200 and 800° C., depending on the type of wafer used. The annealing will cause the metal layer to react with the silicon semiconductor substrate to form a metal silicide layer 18, as shown in FIG. 2.

After RTA, the sheet resistance of several sites are measured using a four point probe or other device. Sheet resistance uniformity u $\%=(\sigma/x)\times 100$, where $\sigma$ is the standard deviation of all points measured and x is the mean of all measured points.

Figure 3:
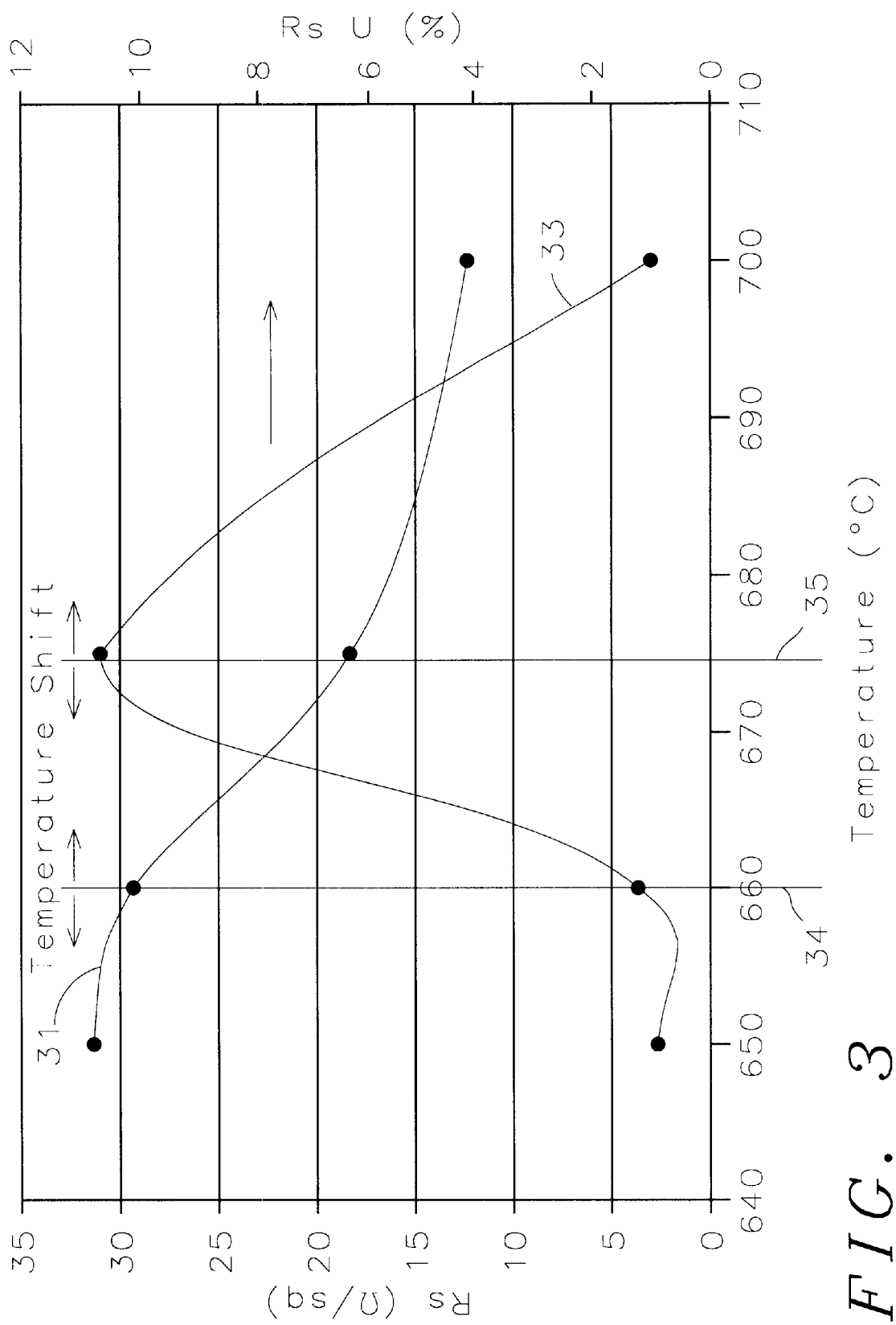
FIG. 3 graphically illustrates temperature versus sheet resistance and uniformity for one type of wafer.

FIG. 3 graphically illustrates the temperature sensitivity of Ti/Co/Si wafers. These sample wafers had a layer of cobalt 130 Angstroms thick and a capping titanium layer of 200 Angstroms. Sheet resistance and sheet resistance uniformity were measured at four temperature points during the RTP process. Line 31 shows the resistance values for increasing temperatures. Line 33 shows the uniformity values for increasing temperatures. Because the phase transition takes place, the phase transition temperatures can be identified from the highest uniformity line. That is, in this example, temperature 35 indicates a phase transition. The highest sheet resistance uniformity (u %) indicates the recipe temperature set point.

Any changes in the recipe set point from temperature 35 in FIG. 3 indicates a temperature shift and the need to shut down the system if the shift is large, depending on the process window. Any temperature shift will cause a huge change in the measured sheet resistance uniformity and can be detected easily.

Table 1 shows some set point temperatures determined for three types of wafers.

TABLE 1

| Film Type | Ni/Si | Ti/Co/Si | Ti/Si |
|---|---|---|---|
| Highest u % after RTP | ~200° C. | ~675° C. | ~730° C. |

Once the above temperatures are found precisely, these multiple points can be used for calibration.

Figure 4:
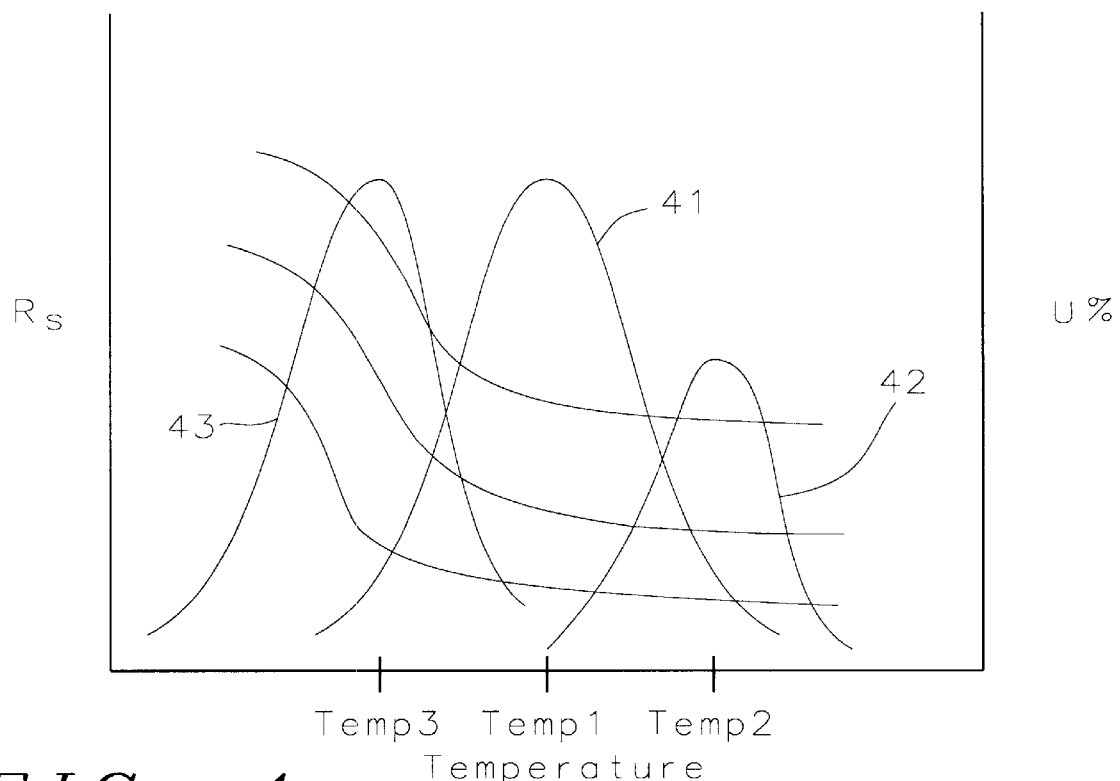
FIG. 4 graphically illustrates temperature versus sheet resistance and uniformity different RTP systems.

FIG. 4 illustrates baseline uniformity curve 41 for a particular wafer type. Temp 1 is the temperature set point determined by the highest uniformity point. In using the process of the present invention to monitor a single RTP system, if the highest uniformity shifts to temp 2 or temp 3, (curves 42 or 43, respectively) this indicates a temperature shift and the need to reset the system. In matching RTP systems, if system 1 has the highest u % at temp 1 and system 2 has the highest u % at temp 2 or temp 3, system 2 needs to be adjusted.

Figure 5:
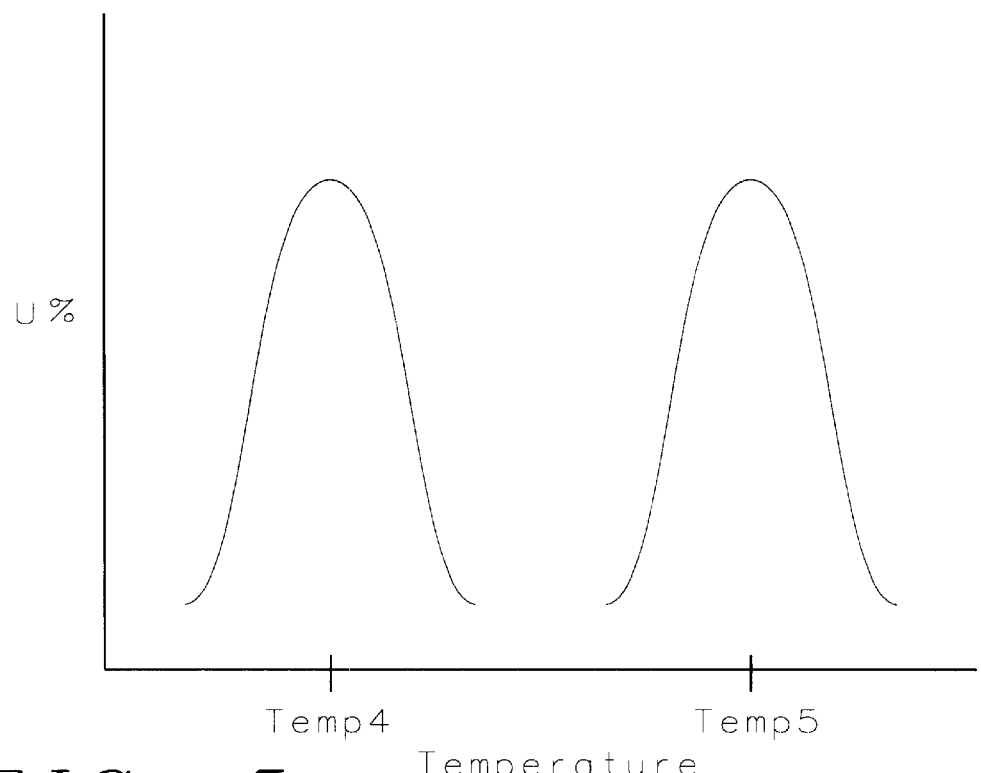
FIG. 5 graphically illustrates temperature versus sheet resistance and uniformity for two types of wafers.

FIG. 5 illustrates baseline uniformity curve 51 for a first type of refractory wafer. Its set point is temp 4. Baseline uniformity curve 52 for a second type of refractory wafer has a set point of temp 5. Since different types of refractory wafers have different phase transition temperatures, two or more types of wafers can be used to calibrate the RTP temperature sensor. In this example, both temperatures temp 4 and temp 5 will be used to calibrate the RTP temperature sensor. The calibration temperature can be as low as about 200° C. and as high as 800° C. For example, $NiSi_x$ phase transition temperature is close to 200° C., $TiSi_x$ is at 730° C., and $WSi_x$ may be higher.

The process of the present invention uses peak sheet resistance uniformity to determine phase transition temperature set points for rapid thermal process low temperature applications. These temperature set points can be used to calibrate RTP systems, to control RTP systems, and to match temperatures between RTP systems.

While the invention has been particularly shown and described with reference to the preferred embodiments thereof, it will be understood by those skilled in the art that various changes in form and details may be made without departing from the spirit and scope of the invention.

What is claimed is:

1. A method of calibrating a rapid thermal process system comprising:

siliciding in said rapid thermal process system a wafer comprising a silicon semiconductor substrate having a refractory metal layer thereon;

measuring sheet resistance uniformity of said wafer and thereby detecting silicidation phase transition temperature points at the highest value of said sheet resistance uniformity; and using said temperature points to calibrate said rapid thermal process system.

2. The method according to claim 1 wherein said refractory metal layer is selected from the group containing cobalt, titanium, nickel, tungsten, molybdenum, tantalum, and platinum.

3. The method according to claim 1 wherein said refractory metal layer is sputter deposited to a thickness of less than about 100 Angstroms to about 1000 Angstroms.

4. The method according to claim 1 further comprising depositing a capping layer overlying said refractory metal layer.

5. The method according to claim 4 wherein said capping layer is selected from the group containing titanium, and titanium nitride and wherein said capping layer is sputter deposited to a thickness of less than about 100 Angstroms to about 500 Angstroms.

6. The method according to claim 1 wherein said rapid thermal process system is selected from the group containing: silicidation, and low temperature annealing.

7. The method according to claim 1 wherein said rapid thermal process system is a low temperature process at a temperature of between about 200 and 800° C.

8. The method according to claim 1 further comprising using said temperature points to calibrate said rapid thermal system to match another said rapid thermal system.

9. The method according to claim 1 further comprising siliciding a plurality of wafers wherein said refractory metal layer has a plurality of thicknesses and wherein some of said plurality of wafers further comprise a capping layer overlying said refractory metal layer wherein a plurality of silicidation phase transition temperature points are detected and wherein said plurality of temperature points are used to calibrate said rapid thermal process system.

10. A method of resetting a rapid thermal process system to a set temperature point comprising:

siliciding in said rapid thermal process system a first wafer comprising a silicon semiconductor substrate having a refractory metal layer thereon;

siliciding in said rapid thermal process system a second wafer comprising a silicon semiconductor substrate having same said refractory metal layer thereon;

measuring sheet resistance uniformity of said first and second wafers and thereby detecting silicidation phase transition temperature point at the highest value of said sheet resistance uniformity;

comparing said highest uniformity temperature point to said set temperature point to detect a temperature shift; and using said temperature shift to reset said rapid thermal process system.

11. The method according to claim 10 wherein said refractory metal layer is selected from the group containing cobalt, titanium, nickel, tungsten, molybdenum, tantalum, and platinum.

12. The method according to claim 10 wherein said refractory metal layer is sputter deposited to a thickness of less than about 100 Angstroms to about 1000 Angstroms.

13. The method according to claim 10 further comprising depositing a capping layer overlying said refractory metal layer.

14. The method according to claim 13 wherein said capping layer is selected from the group containing titanium, and titanium nitride and wherein said capping layer is sputter deposited to a thickness of less than about 100 Angstroms to about 500 Angstroms.

15. The method according to claim 10 wherein said rapid thermal process system is selected from the group containing: silicidation, low temperature annealing, and heating.

16. The method according to claim 10 wherein said rapid thermal process system is a low temperature process at a temperature of between about 200 and 800° C.

17. The method according to claim 10 further comprising siliciding a plurality of first and second wafers wherein said refractory metal layer has a plurality of thicknesses and wherein some of said plurality of wafers further comprise a capping layer overlying said refractory metal layer wherein a plurality of first and second silicidation phase transition temperature points are detected and wherein said plurality of first and second temperature points are compared to detect said temperature shift.

18. A method of temperature matching a plurality of rapid thermal process systems comprising:

siliciding in each of said plurality of rapid thermal process systems a wafer comprising a silicon semiconductor substrate having a refractory metal layer thereon;

measuring sheet resistance uniformity of each of said wafers and thereby detecting silicidation phase transition temperature points at the highest value of sheet resistance uniformity for each of said rapid thermal process systems; and using said temperature points to match temperatures for each of said rapid thermal process systems.

19. The method according to claim 18 wherein said refractory metal layer is selected from the group containing cobalt, titanium, nickel, tungsten, molybdenum, tantalum, and platinum.

20. The method according to claim 18 wherein said refractory metal layer is sputter deposited to a thickness of less than about 100 Angstroms to about 1000 Angstroms.

21. The method according to claim 18 further comprising depositing a capping layer overlying said refractory metal layer.

22. The method according to claim 21 wherein said capping layer is selected from the group containing titanium, and titanium nitride and wherein said capping layer is sputter deposited to a thickness of less than about 100 Angstroms to about 500 Angstroms.

23. The method according to claim 18 wherein said rapid thermal process systems are selected from the group containing: silicidation, low temperature annealing, and heating.

24. The method according to claim 18 wherein said rapid thermal process systems are low temperature processes at a temperature of between about 200 and 800° C.

25. The method according to claim 18 further comprising siliciding a plurality of first and second wafers wherein said refractory metal layer has a plurality of thicknesses and wherein some of said plurality of wafers further comprise a capping layer overlying said refractory metal layer wherein a plurality of first and second silicidation phase transition temperature points are detected and wherein said plurality of first and second temperature points are compared to detect said temperature shift.

* * * * *

UNITED STATES PATENT AND TRADEMARK OFFICE
CERTIFICATE OF CORRECTION

PATENT NO. : 6,517,235 B2
DATED : February 11, 2003
INVENTOR(S) : Zhong Yun Zhu et al.

It is certified that error appears in the above-identified patent and that said Letters Patent is hereby corrected as shown below:

<u>Title page,</u>
Item [73], please add -- Lucent Technologies, Inc., Allentown, PA (US) --

Signed and Sealed this

Nineteenth Day of August, 2003

JAMES E. ROGAN
*Director of the United States Patent and Trademark Office*